US006401083B1

(12) United States Patent
Agarwal et al.

(10) Patent No.: US 6,401,083 B1
(45) Date of Patent: *Jun. 4, 2002

(54) METHOD AND MECHANISM FOR ASSOCIATING PROPERTIES WITH OBJECTS AND INSTANCES

(75) Inventors: Nipun Agarwal, San Mateo; Viswanathan Krishnamurthy, Fremont, both of CA (US); Jagannathan Srinivasan, New Hampshire, CT (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/275,896

(22) Filed: Mar. 18, 1999

(51) Int. Cl.[7] .............................................. G06F 17/30
(52) U.S. Cl. .................................... 707/2; 707/1; 707/3
(58) Field of Search ........................... 707/2, 3, 4, 103, 707/102; 717/2; 714/20

(56) References Cited

U.S. PATENT DOCUMENTS

| | | | | |
|---|---|---|---|---|
| 5,506,955 A | * | 4/1996 | Chen et al. .................... | 714/20 |
| 5,544,355 A | | 8/1996 | Chaudhuri et al. ............ | 707/2 |
| 5,551,029 A | | 8/1996 | Jagadish et al. ............... | 707/2 |
| 5,754,841 A | * | 5/1998 | Carino, Jr. ..................... | 707/3 |
| 5,930,785 A | * | 7/1999 | Lohnman et al. .............. | 707/2 |
| 5,960,197 A | * | 9/1999 | Segnan .......................... | 717/2 |
| 6,009,265 A | * | 12/1999 | Huang et al. .................. | 707/1 |
| 6,012,054 A | | 1/2000 | Seputis .......................... | 707/3 |
| 6,026,391 A | * | 2/2000 | Osborn et al. ................. | 707/2 |
| 6,195,653 B1 | | 2/2001 | Bleizeffer et al. ............. | 707/2 |

OTHER PUBLICATIONS (IEEE publication) An Extended Model for Integration between the Oracle and WWW by Gi–Hwa Jang et al., Dept., of Computer Sci., South Korea, pp. 569–572, vol. 1.
Derwent Information Ltd., "Database statement execution optimizing for database query or manipulation, involves associating generated function with database object, calling database statement and function to compute cost of execution plan" by N. Agarawal.
Chimenti, D. et al.; "Towards An Open Architecture For LDL"; *Proceedings Of The Fifteenth International Conference On Very Large Data Bases*; pp. 195–203; Amsterdam, Aug. 1989.
Agrawal R. et al.; "ODE (Object Database and Environment): The Language And The Data Model"; *ACM SIGMOD International Conference On Management Of Data*; vol. 18, No. 2, pp. 36–45; Jun. 1989.

(List continued on next page.)

*Primary Examiner*—Diane D. Mizrahi
(74) *Attorney, Agent, or Firm*—Lyon & Lyon LLP

(57) ABSTRACT

A method and system for associating properties in a computer system is described. An aspect relates to a mechanism for dynamically determining the value of a property for an instance or object, which can override the property defined for the class or object type. Another aspect relates to a mechanism for dynamically changing at run-time the set of properties associated with system structures, such as classes, object types, instances, or objects. Yet another aspect relates to a mechanism that can associate or disassociate an entire set of properties at the same time, rather than having to separately associate or disassociate each property within a set of properties. A further aspect relates to a mechanism for allowing particular instances or objects to explicitly not inherit properties of its familial class or object type.

45 Claims, 10 Drawing Sheets

OTHER PUBLICATIONS

Finance, Beatrice et al.; "A Rule–Based Query Rewriter In An Extensible DBMS"; *IEEE Comp. Soc. Press*; vol. Conf. 7, 8; pp. 248–256; Apr. 8, 1991.

Derrett, N. et al.; "Rule–Based Query Optimization In IRIS"; *ACM Computer Science Conference*; Feb. 21–23, 1989.

Chaudhuri, Surjit; "An Overview Of Query Optimization In Relational Systems"; *Proceedings Of The AC Sigact–Sigmod–Sigart Symposium On Principles Of Database Systems*, New York; pp. 34–43; Jun. 1, 1998.

Carey, M.J., et al.; "Object–Relational Database Systems: Principles, Products, and Challenges"; SIGMOD 1997, *Proceedings ACM SIGMOD International Conference on Management of Data*; May 13–15, 1997; Tucson, Arizona; ACM Press 1997; SIGMOD Record 26(2), Jun. 1997; p. 502 and Tutorial Notes.

Stonebraker, M., et al.; "Object–Relational DBMSs—The Next Great Wave"; *Morgan Kaufmann Publishers Inc.*, San Francisco, CA; pp. 121–122; 1996.

Mitschang, Bernhard; "Anfrageverarbeitung in Datenbanksystemen: Entwurfs– und Implementierungskonzepte"; Vieweg Verlag, Braunschweig/Wiesbaden, Germany; 1995.

Mattos, N.M.; "The KBMS–Protoytpe Krisys—User Manual"—vol. 1 Overview; Version 2.8, *Computer Science Department*; University of Kaiserslautern, Germany; Dec. 1992.

* cited by examiner

| OBJECT | ASSOCIATION | ATTRIBUTES |
|---|---|---|
| Object_type 1 | Property_1 | Attribute 1 |
| Object A | Property_1 | Attribute 2 |
| Object B | Property_1 | NULL |
| Object A | Property_2 | Attribute3, CIRCLE |
| Object B | Property_2 | Attribute4, SQUARE |
| ... | ... | ... |

FIG. 1

| OBJECT | ATTRIBUTES |
|---|---|
| Object_type 1 | Attribute 1 |
| Object A | Attribute 2 |
| Object B | NULL |
| ... | ... |

Property_1 Association Table

FIG. 2A

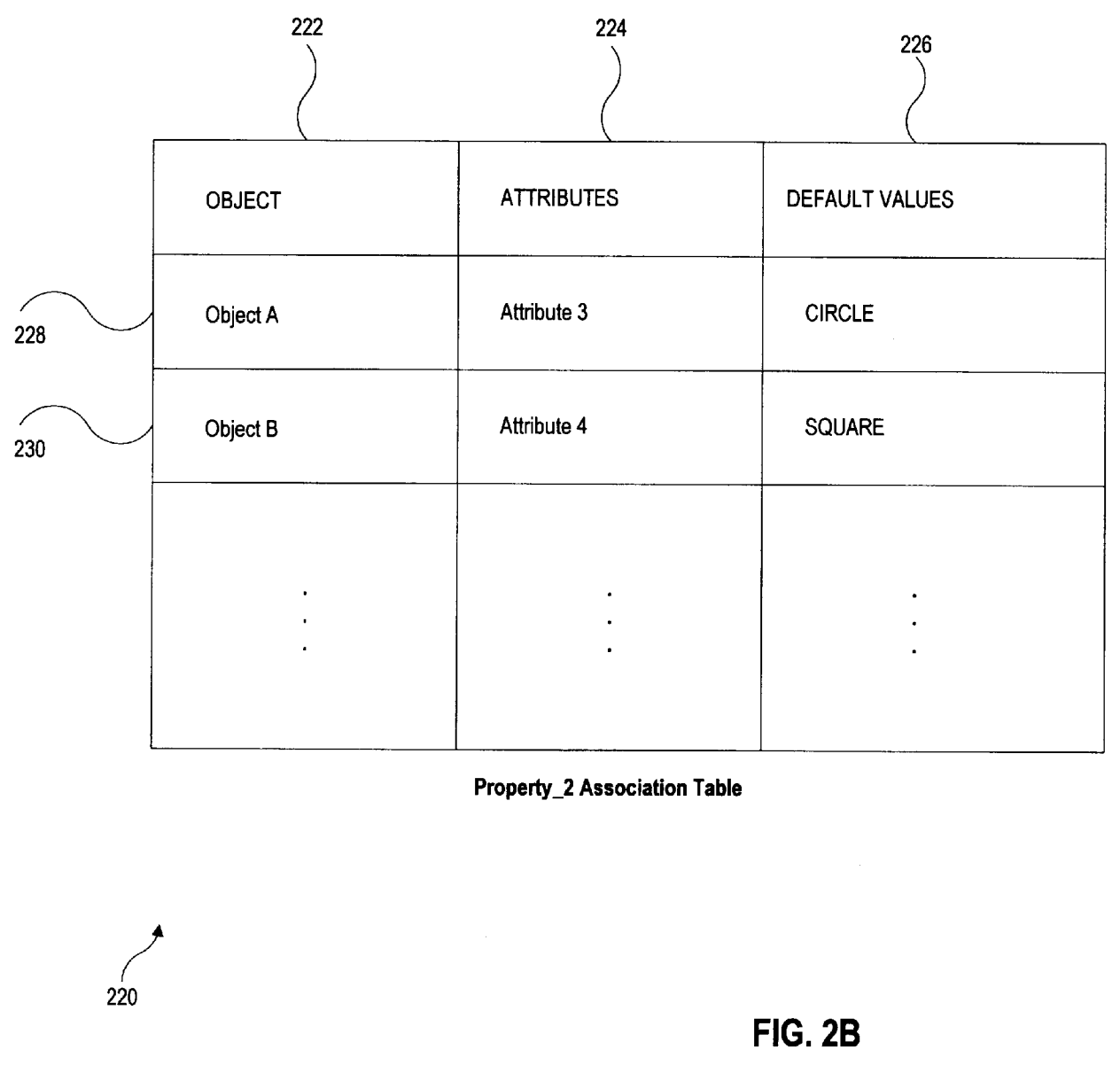

| OBJECT | ATTRIBUTES | DEFAULT VALUES |
|---|---|---|
| Object A | Attribute 3 | CIRCLE |
| Object B | Attribute 4 | SQUARE |
| ... | ... | ... |

Property_2 Association Table

FIG. 2B

| OBJECT | ATTRIBUTES |
|---|---|
| Obj_type1 | Stats1 |
| . . . | . . . |

FIG. 4A

| OBJECT | STATISTICS |
|---|---|
| T1.Col1 | <Statistics collected using Stats1> |
|  |  |

FIG. 4B

| OBJECT | ATTRIBUTES |
|--------|------------|
| Obj_type1 | Stats1 |
| T1.Col.1 | Stats2 |
| ... | ... |

FIG. 5A

| OBJECT | STATISTICS |
|--------|------------|
|  |  |
|  |  |

FIG. 5B

METHOD AND MECHANISM FOR ASSOCIATING PROPERTIES WITH OBJECTS AND INSTANCES

BACKGROUND OF THE INVENTION

FIELD OF THE INVENTION

The present invention relates to the definition and association of object properties in a computer system.

BACKGROUND

In computer systems, associations can be made between objects on the system and one or more "properties". A property encompasses any constraint, definition, operation, or any other definable association that can be made between the object and other entities in the computer system. A "class" or "object type" refers to a definition of a family of objects or system structures. An "instance" is an instantiation of a class or object type definition, and is often created at run-time.

The properties of an instance are normally inherited from the properties defined for its familial class or object type. As an example, consider the database statement below which is in the Oracle8 structured query language ("SQL") syntax (for the Oracle8 database management system available from Oracle Corporation of Redwood Shores, Calif.):

```
CREATE TABLE stock_xactions
    (stock_symbol CHAR(5),
    stock_series CHAR(1),
    num_shares NUMBER(10),
    price NUMBER(5,2),
    trade_date DATE)
TABLESPACE ts0
STORAGE (INITIAL 100K NEXT 50K) LOGGING
PARTITION BY RANGE (trade_date) p2 (PARTITION
    sx1992 VALUES LESS THAN (TO_DATE('01-JAN-
    1993','DD-MON-YYYY')),
    PARTITION sx1993 VALUES LESS THAN (TO_
    DATE('01-JAN-1994','DD-MON-YYYY'))
    TABLESPACE ts1,
    PARTITION sx1994 VALUES LESS THAN (TO_
    DATE('01-JAN-1995','DD-MON-YYYY'))
    TABLESPACE ts2);
```

This SQL statement creates multiple partitions (i.e., partitions sx1992, sx1993, and sx1994) within a table stock_xactions. Each partition is considered an instance of the class stock_xactions. In this example, partition sx1992 inherits all properties, including the TABLESPACE property, from the definition of the class stock_xactions. Thus, both the class stock_xactions and the instance sx1992 have the TABLESPACE property ts0. It is possible for an instance to override the definition made for its class. For example, partitions sx1993 and sx1994 have been defined to override the TABLESPACE property of its familial class. Specifically, partition sx1993 is defined to have TABLESPACE ts1 and partition sx1994 is defined to have TABLESPACE ts2.

Note that this definition of properties for classes and instances is static. It is often desirable to dynamically add, change, or delete properties of classes, objects, or object types, even for run-time instantiations of these entities. For example, it is often desirable to change either the set of properties, or to change the value of one or more properties, that have been defined for instances on the system, particularly when the new set of properties or new property value is to be dynamically determined at run-time. However, once the above SQL statement has been executed to create the defined partitions, known systems do not have a mechanism to dynamically determine the properties of the respective class or instances. To change any of the properties for the class or instance defined by the above example, known systems would need to drop and recreate the table with new definitions for the respective class and instances.

Therefore, there is a need for a method and mechanism that addresses these and other problems for associating and defining properties in a computer system. There is a need for a method and mechanism that allows properties of a class, object type, object, instance, or other system entities to be dynamically changed.

SUMMARY OF THE INVENTION

A method and system for associating properties in a computer system is described. An aspect of the invention relates to a mechanism for dynamically determining the value of a property for an instance or object, which can override the property defined for the class or object type. Another aspect of the invention relates to a mechanism for dynamically changing at run-time the set of properties associated with system structures, such as classes, object types, instances, or objects. Yet another aspect of the invention relates to a mechanism that can associate or disassociate an entire set of properties at the same time, rather than having to separately associate or disassociate each property within a set of properties. A further aspect of the invention relates to a mechanism for allowing particular instances or objects to explicitly not inherit properties of its familial class or object type.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

FIG. 1 depicts a table for registering associations between objects and object properties according to an embodiment of the invention.

FIGS. 2A and 2B depict alternative tables for registering associations between objects and object properties.

FIG. 4A depicts an illustrative example of an association table.

FIG. 4B depicts an illustrative example of a table to store statistics.

FIG. 5A depicts an amended version of the association table of FIG. 4A.

FIG. 5B depicts an amended version of the table of FIG. 4B.

DETAILED DESCRIPTION

Figure 3:
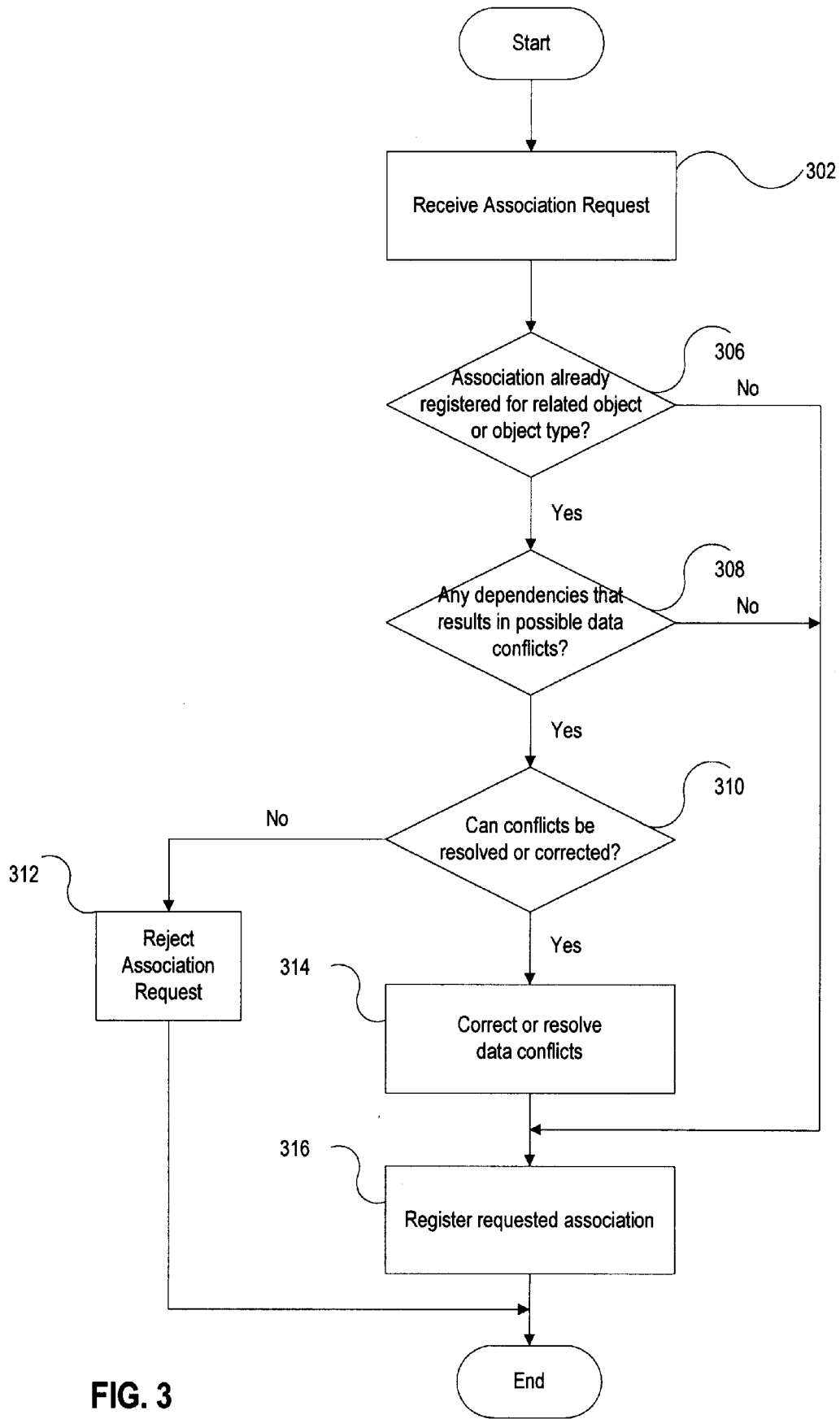
FIG. 3 shows a process flow for registering associations between objects and object properties according to an embodiment of the invention.

In the following description, for the purposes of explanation, numerous specific details are set forth in order to provide a thorough understanding of the present invention. It will be apparent, however, to one skilled in the art that the present invention may be practiced without those specific details. For example, much of the following illustrative explanation is made in the context of database optimizer functions. However, the invention is applicable to other applications and contexts in a computer, and indeed may be used to register or associate properties with any entity in the system.

A method and mechanism for associating properties with classes, object types objects, instance, and other system entities are described. For the purposes of illustration only, and not as an intent to limit the scope of the invention, the following description uses the terms "object type" and "object"; note however, that the invention is not limited to object-oriented concepts and is equally applicable to other types of system structures (e.g., non-object-oriented classes and instances).

According to an embodiment of the invention, an object property can be associated to an object in at least two ways. First, the association can be made to a specific instance of an object. Alternatively, the association can be made to the object type, object family, or class to which the instance belongs. In this alternative approach, each instance implicitly inherits the association made with the object property that was registered for the familial object type.

According to an embodiment of the invention, at least three states can be defined for the association of an object property:

1. An object property can be associated with an object type (i.e., an entire family of objects). By associating an object property with an object type, each instance of the object is automatically registered to have the associated object property. The object property is therefore associated with all instances of that object type without requiring each instance to individually register to the object property. However, individual instances of the registered object type can opt out of the association, as set forth below.
2. An object property can be associated with a specific instance of an object type. By making an explicit association, an instance of an object type can be registered to a particular object property having certain attributes, even the familial object type is associated with a different object property or with the same object property but with different attributes. Furthermore, an instance of an object type can be registered to a particular property, even if that object property has not been associated with its familial object type.
3. An object can be explicitly defined not to be associated with an object property. This allows a particular object instance to opt out of an association that has been registered for its familial object type.

According to an embodiment of the invention, in the absence of states 1 or 2, or the presence of state 3, then an object property is not associated with an object or object type. In the absence of states 2 or 3, an object instance inherits the object property associated with an object type. If state 2 is present, then an object instance is associated with the specific object property defined for that instance.

FIGS. 2A and 2B illustrate one approach for implementing the invention, in which database tables are employed to register associations between objects and object properties. According to the approach of FIGS. 2A and 2B, separate association tables are created for each object property that is to be associated with objects on the system. If an object or object type is to be associated with an object property, then an entry is made to the respective association table for that object property to indicate the association. If there is no entry in the association table for an object, then the object is not associated with that object property.

FIG. 2A depicts an association table 202 for associating objects with object property "Property_1". FIG. 2B depicts an association table 220 for associating objects with object property "Property_2". Note that the schema of association table 220 is different than the schema of association table 202. In particular, association table 220 contains an additional field (i.e., the default values field 226) that is not present in association table 202. Each association table for an object property can have different fields, depending upon the specific characteristics of the object property to which it is directed.

For the purposes of illustration, consider an object type "Object_type1" for which there exists two object instances "ObjectA" and "ObjectB". Referring to FIG. 2A, shown is association table 202 for associating objects to an object property "Property_1". Association table 202 comprises an object field 204 which contains an identifier of the object or object type that is being registered. Association table 202 also comprises an attribute field 206 that defines specific attributes of the object property for the object being registered.

Entry 208 is an example of State 1 as set forth above, in which registration to an object property is made for an entire object type. Entry 208 of database table 202 identifies object type Object_type1 as being associated with Property_1. Thus, each instance of Object_type1 automatically inherits the association that is being registered with the object property Property_1 (unless it opts out of the association pursuant to states 2 or 3). The attributes field 206 of entry 208 identifies "Attribute1" as a specific attribute of Property_1 being associated with Object_type1.

Entry 210 is an example of State 2 as set forth above, in which an association is made for an instance of an object type. Object field 204 of entry 210 identifies ObjectA as the object for which an association is being made. Note that ObjectA is a specific instance of the object type "Object_type1" that was registered in entry 208. Entry 210 is separately registering ObjectA apart from the prior registration for its familial object type; thus, the registration for ObjectA overrides the registration that was made for Object_type1. In particular, note that the attributes field 206 for entry 210 registers a different set of attributes than the registration for its familial object type in entry 208. Therefore, even though both ObjectA and its object type are associated with the same object property, the attributes of that association can be different for ObjectA than it is for other instances of its familial object type.

Entry 212 is an example of State 3 as set forth above, in which an object is specifically designated as not inheriting the object property registered for the parent. Object field 204 identifies ObjectB as the object for which registration is being made. Note that ObjectB is a specific instance of the object type that was registered in entry 208. The attributes field 206 of entry 212 contains information that lets the computer system know that ObjectB is specifically opting out of the registration that had been made for its familial object type (e.g., the attributes field may contain a term such as "NULL" that denotes a state 3 registration).

FIG. 2B depicts an association table 220 for associating objects with an object property "Property_2". Association table 220 comprises an object field 222 that contains an identifier of an object or object type to be associated with Property_2. Attributes field 224 contains information regarding attributes for the object property being associated with the object or object type identified in object field 222. Association table 220 also contains a default values field 226 to contain default values for the object property.

Note that association table 220 does not have any entries that implement states 1 or 3 above. Thus, no families of object types are associated with Property_2. Instead, entry 228 of association table 220 is directed to the registration of ObjectA with object property Property_2. Entry 230 is directed to the registration of ObjectB with object property Property_2. Both ObjectA and ObjectB are instances of Object_type1. Since the object type is not being registered, the other instances of this object type therefore are not being associated with this object property.

Referring to FIG. 1, shown is an embodiment of a single association table 102 that can be used for the registration of multiple object properties. Association table 102 comprises an object field 104, an association field 106, and an attributes field 108. Object field 104 contains an identifier of an object or object type for which an association is being registered. Association field 106 identifies the specific object property that is being associated with the object or object type identified in object field 104. Attributes field 108 contains information regarding attributes of the object property identified in association field 106. The format of association table 102 allows the associations made by both association table 202 and association table 220 (FIGS. 2A and 2B) to be registered within a single table.

Entries 110, 112, and 114 of association table 102 are directed to associating objects with Property_1 (as indicated by the contents of the association field 106 for these entries). Thus, entries 110, 112, and 114 parallel the entries made in association table 202 of FIG. 2A. In particular, object field 104 of entry 110 identifies Object_type1 as the object type which is being registered, similar to the object field contents of entry 208 from FIG. 2A. Attributes field 108 of entry 110 similarly identifies Attribute1 as the attribute of the object property for this association. However, since multiple object properties are registered in association table 102, the association field 106 is used to specifically identify the object property for which registration is being made. Thus, the association field 106 of entry 110 identifies Property_1 as the object property which is being association with Object_type1.

Entries 112 and 114 of association table 102 are directed to the registration of ObjectA and ObjectB, respectfully. The object field 104 of entry 112 identifies ObjectA as the object being registered, and the association field 106 identifies Property_1 as the object property being associated with ObjectA. The object field 104 of entry 114 identifies ObjectB as the object being registered, and the association field 106 identifies Property_1 as the object property for which registration is being made. The attributes field 108 indicated that a specific declaration of non-association is being made for the ObjectB/Property_1 pairing. Thus, entries 112 and 114 essentially parallel the registrations made by entries 210 and 212 in the association table 202 of FIG. 2A.

Entries 116 and 118 of association table 102 are directed to associating objects with object property Property_2 (as indicated in the association field 106 for entries 116 and 118). Thus, entries 116 and 118 parallel entries 228 and 230 made in association table 220 of FIG. 2B. In particular, entry 116 is directed to the registration of ObjectA with Property_2 and entry 118 is directed to the association of ObjectB with Property_2. Note that in FIG. 1, association table 102 does not contain a separate default values field as is present in association table 220 of FIG. 2B. Instead, the default values are added as part of the information contained in the attributes field of entries 116 and 118. The invention is not dependent or limited to a specific schema for an association table. Rather, the data structure used to store registration can be configured in many alternate ways so long as the identified object or object type is associated with an object property. The attributes of that association can be stored in different ways depending upon the needs of the system or users.

FIG. 3 depicts a process flow for performing associations according to an embodiment of the invention. Initially, a request is received regarding an association between an object and an object property (302). The request can be directed to a new association between an object property and an object or object type. The request may also be directed to a change of an existing association. For example, the request may seek to modify attributes of an existing association, to delete an existing association, or to override an existing association for an object or object type.

A determination is made as to whether an association has already been made for object instance or object type related to the requested association (306). For example, if the association request is directed to the registration of ObjectA, then a determination is made whether either ObjectA, or its familial object type Object_type1 has already been registered for the indicated object property. If the association request is directed to the registration of an entire object type, then a determination is made only for whether that object type has been registered to the indicated object property; each previously registered instance of that object type is not checked unless there is a concern of possible conflicts for the requested registration.

If the object instance, familial object type, or other related objects have already been registered, then a determination is made whether there exists any data dependencies such that the requested association results in data conflicts, potential data conflicts, or data inconsistencies (308). Data in the system may be dependent or related to particular attributes defined for an object property that is associated to an object. Changing an association of an object to an object property may result in a conflict with existing data that is reliant upon the state of the system prior to the new association. If not detected and corrected, the conflict may create data inconsistencies on the system.

If there are such dependencies or potential conflicts, then a determination is made as to whether the conflicts can be resolved or corrected (310). If the conflict cannot be resolved or corrected, then the requested association is rejected (312). If the conflict can be corrected, then the appropriate corrections are made (314). Once the conflict has been resolved, then the requested association is registered in the respective association table (316).

ILLUSTRATIVE EXAMPLE

As an illustrative example, consider the process of optimization in a database system. Optimization is the process of choosing an efficient way to execute a database query or manipulation action. Examples of such query or manipulation actions include searching, retrieving, modifying, organizing, adding, and/or deleting information from the database. These database query/manipulation actions are normally initiated by submitting commands to a database server in a database query language. One popular database query language is known as the Structured Query Language ("SQL"). For the purposes of explanation only, and not by way of limitation, the following description is made with particular reference to database statements involving SQL.

To execute a database query language statement (e.g., a SQL statement), the database system may have to perform steps involving the retrieval or manipulation of data from various database structures, such as tables and indexes. Often, there exists many alternate ways to execute the SQL statement. For example, a single SQL statement can be executed in different ways by varying the order in which tables and indexes are accessed to execute the statement. The exact combination and order of steps taken to execute the SQL statement can drastically change the efficiency or speed of execution for the statement. The combination and order of steps that are used to execute a SQL statement is referred to as an "execution plan."

An "optimizer" is used by a database system to choose what is believed to be the most efficient execution plan for a SQL statement. A "cost-based" optimizer bases its decision upon the costs of each execution plan. The cost-based optimizer typically generates a set of potential execution plans for the SQL statement based upon available access paths for the data sought to be operated upon by that statement. The cost is then estimated for each execution plan based upon, for example, data distribution and storage characteristics for database structures holding relevant data for the SQL statement. The optimizer then compares relative costs of the execution plans to choose the one with the smallest cost.

The cost-based optimizer may use statistics to estimate the cost of the execution plans. Statistics are used to quantify the data distribution and/or storage characteristics of data in database structures. Selectivity estimates can be performed to determine the data skew of data values. Selectivity is normally calculated with reference to the statistics, and can be stated as the percentage of entries within a schema object that satisfies a given predicate. Costs can be calculated with reference to the selectivity of the predicate in the SQL statement.

As an example, consider the following SQL statement, which queries for the name of all employees having a salary equal to 100 from a database table "emp_table":

SELECT employee_name
FROM emp_table
WHERE salary=100

A first execution plan could include the step of performing a fall table scan of emp_table to execute the query. This first execution plan would retrieve every row from emp_table to identify particular rows that match the WHERE clause. Alternatively, if an index exists for the "salary" column of emp_table, then a second execution plan could involve accessing the index to identify rows that match the WHERE clause, and thereafter retrieving only those identified rows from the table. The index is considered an alternate "access path" to the data sought by the SQL statement.

Each execution plan has a "cost" that is associated with its execution. The cost of an execution plan can be expressed in terms of the resources that are consumed to execute the SQL statement using that execution plan. For example, the cost of an execution plan can be expressed in units of I/O, CPU, network usage, memory usage, or a numerical value that combines several of these units.

The cost of an execution plan can be estimated based upon the statistics and selectivity associated with terms within the SQL statement predicate. As an example, consider if an index exists upon the "salary" column for the above SQL statement example. If so, then the following is an example of a cost calculation that can be used to estimate the cost of an execution plan that uses an index to execute the above SQL statement:

COST=(cost of access for a single row)*(selectivity)* (number of rows in table)+(cost of index access)

An example of a cost calculation for an execution plan that performs a full table scan is expressed as follows:

COST=(cost of access for a single row of table)*(number of rows in table)

Based upon such cost calculations, an optimizer can make a determination as to which of these execution plans is relatively less costly.

Typical database systems have built-in support for certain "system-supplied" objects, such as built-in data types, functions, and access methods. For example, "CHAR" is a common built-in data type that is used to store character strings. B+Trees and Hash Tables are two examples of built-in access methods that can be found in conventional database systems. In recent years, databases are being used to store different types of data, such as spatial, image, video, and audio data. Often, these data types are not native to the database system; it is unrealistic to attempt to provide native support for all possible data types since it is impossible to foresee all possible types of complex data that may be created for storage in the database. Therefore, some database systems can be configured to allow non-native or "user-defined" data types to be defined for the database. For many of these non-native data types, system-supplied access methods and functions cannot be applied to operate upon them, since the structure and characteristics of these data types are not supported by the system-supplied access methods and functions. To provide efficient data operations upon these data types, some database systems also allow non-native or user-defined access methods and functions to be defined to extend the database system.

Because the structure, operation, and characteristics of built-in objects are known to the database system and to the designers of the system-supplied database optimizer, traditional optimizers can generate cost estimate for execution plans involving such native entities or access methods. These cost estimates can be used to choose an optimal execution plan for a SQL statement involving built-in entities.

Unfortunately, traditional optimizers encounter significant problems attempting to generate an optimal execution plan if the SQL statement involves non-native objects, such as user-defined data types, functions, and access methods. This results because the system-supplied cost, selectivity, and statistics functions are not specifically configured to recognize or work with non-system-supplied entities, operations, and access methods. If the optimizer cannot accurately estimate the cost of an execution plan involving non-native objects, thene relatively inefficient or slow execution plans may be mistakenly chosen by the optimizer.

One approach that can be used to address this problem is to associate objects with non-native optimizer-related properties or operations. According to this approach, non-native cost, statistics, selectivity functions are considered object properties that can be associated with various objects on the system, such as for example, user-defined functions, user-defined indexes, indextypes, packages, and columns. If the optimizer encounters an execution plan involving an object which is associated with a non-native optimizer-related function, that function is called to estimate the cost of that execution plan. Further details regarding optimizers and optimizer-related functions (including optimizers directed to non-native objects) are disclosed in co-pending U.S. application Ser. No. 09/272,691 and co-pending U.S. application Ser. No. 09/272,627, filed on Mar. 18, 1999, both of which are hereby incorporated by reference in their entirety.

According to one embodiment, these optimizer-related functions are defined as methods of an "optimizer object type" that is associated with one or more objects on the system. Thus, the optimizer object type can be considered an object property to be registered to an object. The responsibility for building and maintaining the optimizer object type is given to the domain expert familiar with the object for which costs, selectivity, or statistics is to be determined. The methods are developed with reference to the specific structure and characteristics of the objects with which they are associated.

When a SQL statement is processed involving an object for which a non-native selectivity or cost function has been registered, the registered cost and/or selectivity function can be called by the optimizer by taking into account the estimated cost of an execution plan involving that entity. The collected statistics may be used in determining the cost or selectivity of predicates in the SQL statement. The relative costs of alternate execution plans can thereafter be compared to select the appropriate execution plan to be used.

In typical database systems, a system command is issued to collect statistics for objects on the system. For example, the Oracle 8 database product utilizes the "ANALYZE" command to initiate the collection of statistics. Such a statistics collection command can be extended to call non-native statistics collection functions where appropriate.

An optimizer object type can be defined for objects on the database system. The optimizer object type can be configured to include non-native statistics functions. According to an embodiment, if the optimizer object type is directed to entities for which statistics are to be collected, then the optimizer object type is defined having two statistics functions. A first function, referred to herein as a StatsCollect function, is used to collect statistics for the entity or entity type. The following is an example of a function interface that can be used for a StatsCollect function:

FUNCTION StatsCollect(column/index identifier, options, statistics OUT)

If the StatsCollect function is being used to collect statistics for a column, then a column identifier is passed to the function. Similarly, if the function is being used to collect statistics for an index, then the index identifier is passed to the function. The "options" parameter indicates any processing options that may be set when the function is invoked. For example, the options parameter can be used to specify the sample size used to collect the statistics. The database system stores the collected results in a raw format to be later interpreted by a user-defined selectivity or cost function that is specifically configured to work with the particular statistics format that has been produced.

A second type of statistics function, referred to herein as the StatsDelete function, is used to delete previously collected statistics from the system. The following is an example of a function interface that can be used for a StatsDelete Function:

FUNCTION StatsDelete (column/index identifier)

According to an embodiment, this function takes a single parameter: a "column" parameter to identify column statistics that are to be deleted or an "index" parameter to identify index statistics that are to be deleted.

Consider a table "T1" which is defined as follows:
CREATE TABLE T1 (
Col1 Obj_type1
)

Assume that "Obj_type1" is a user-supplied object type. Since the column entries are composed of a non-native object type, the structure of the data within column T1.Col1 may not be comprehensible to the built-in statistics collection function of the database system.

If it is desirable to collect statistics for column T1.Col1, then an optimizer object type "Stats1" can be defined to address the specific structure and properties of the data within column T1.Col1, as well as the type of statistics sought to be collected for this column. The details of the StatsCollect and StatsDelete functions for this new optimizer object type would be defined by a user, administrator, or domain expert that is familiar with the structure and properties of the non-native object type "Obj_type1". Once the optimizer object type "Stats1" has been defined, it can be associated or registered with one or more objects on the system.

FIG. 4A depicts an association table 402 that can be used to register objects with the object property "optimizer object type". By registering an object in association table 402, the database system is made aware that non-native optimizer-related functions have been associated with an object. Object field 406 of association table 402 contains an identifier of the object or object type which is being associated with an optimizer object type. Attributes field 408 contains an identification of the particular optimizer object type that is being registered to the object or object type.

Entry 404 in association table 402 is directed to the association of the object type "Obj_type1" with an optimizer object type. Object field 406 identifies the Obj_type1 as the family of objects which is being registered. Attributes field 408 identifies the optimizer object type "Stats1" as being registered to the object type identified in object field 406. The "Stats1" optimizer object type would therefore be associated with all instances of Obj_type1 (unless particular object instances opt out of the association). Since the column "T1.Col1" is an instance of this object type, and a separate entry has not been made in association table 402 for T1.Col1, column T1.Col1 would therefore inherit the association that has been registered for its familial object type.

To invoke the registered statistics collection function for column T1.Col1, an ANALYZE command (or its equivalent in the database system to which the invention is directed) is initiated with T1.Col1 as the input argument. The ANALYZE command checks with association table 402 to determine if there is an optimizer object type registered for this column. If there is such a registration, then verification is made to determine if statistics functions have been defined for the optimizer object type. If it exists, then the statistics collection function is invoked to collect statistics for the "T1.Col1" column.

FIG. 4B depicts an example of a statistics table 410 that can be used to store the results of executing a non-native statistics collection function. Statistics table 410 comprises an object field 414 that identifies the object for which statistics have been collected. A statistics field 416 contains the statistics data that has been collected for the object identified in the object identifier field 412.

Row 412 of statistics table 410 is an example of the results of collecting statistics for column T1.Col1. The object identifier field 414 of row 412 identifies T1.Col1 as the object for which statistics has been collected. Since Stats1 is the optimizer object type which is associated with all instances of Obj_type1, including T1.Col1, the statistics field 416 of row 412 contains statistics that have been collected with the statistics collection function of Stats1.

Consider now if column T1.Col1 is to be specifically registered with an optimizer object type, apart from the general definition that was made for its familial object type. FIG. 5A depicts an amended association table 402, in which a separate entry has been made for column T1.Col1. Specifically, entry 502 is directed to registering the association of column T1.Col1 with the "Stats2" optimizer object type. The general association that has been made for its familial object type Obj_type1 is therefore overridden with respect to object instance T1.Col1 as a result of this separate registration.

Prior to registering object instance T1.Col1, a determination is made as to whether any possible conflicts would result from the registration. According to an embodiment, this determination involves checking existing data on the system for any data inconsistencies that could result from performing the requested registration. In the present example, the statistics table 410 is checked for such possible conflicts. Referring back to FIG. 4B, it is noted that statistics has previously been collected for T1.Col1 using the Stats1 optimizer object type, which is being stored in row 412 of statistics table 410. If the requested registration is performed, then data on the system would be in an inconsistent state because column T1.Col1 would now be associated with optimizer object type Stats2. If the optimizer utilizes the statistics stored for T1.Col1 in statistics table 410, then an error may result since the database now recognizes Stats2 as the optimizer object type for T1.Col1, instead of the Stats1 object type that was actually used to collect the statistics.

Once the potential data conflict has been recognized, appropriate steps can be taken to correct or resolve the conflict. According to an embodiment, the potential conflict can be resolved by deleting statistics that have been collected using the prior optimizer object type. Referring to FIG. 5B, shown is statistics table 410 with entry 412 deleted. Since entry 412 has been deleted, the possible conflict has been removed, and thus the requested registration of column T1.Col1 to Stats2 can be performed. In an alternate embodiment, such potential conflicts are not automatically resolved by the system. Instead, the potential conflict is identified to the requester of the registration, and manual steps are thereafter taken by the requestor to resolve the conflict.

Figure 6:
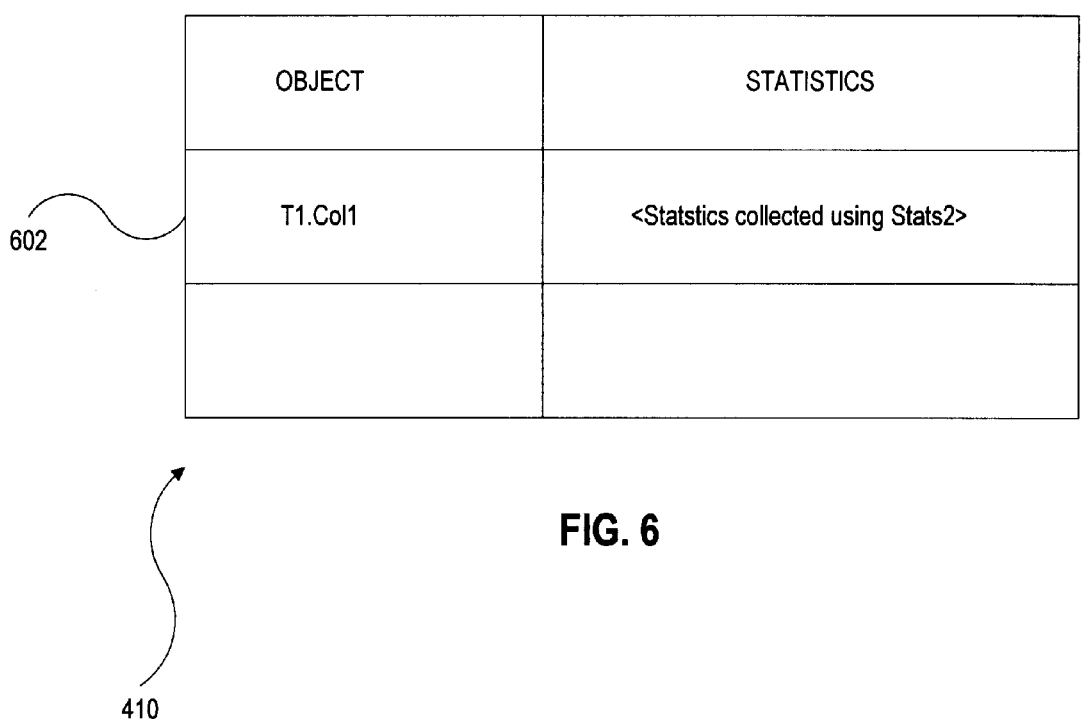
FIG. 6 depicts an amended version of the table of FIG. 5B.

Once column T1.Col1 has been registered to the Stats2 optimizer object type, further operations to collect statistics upon column T1.Col1 would use the statistics collection function defined for Stats2. FIG. 6 depicts an updated statistics table 410, which includes an entry 602. Entry 602 stored the results of collecting statistics upon column T1.Col1. In particular, note that the statistics have been collected using Stats2.

Similar conflict check procedures must be performed for any association requests made to this system. The general rule is that an association can be created, changed, or dropped, but existing data on the system must be considered for possible data inconsistencies and conflicts that result from the new association state. The chain of data dependencies should be analyzed to detect the possible conflicts.

As a further example, consider a request to drop an association. Assume that an object type or object family has been associated with Stats1 and an object instance of that object type has already collected statistics using Stats1 based upon the general association made for its familial object type. Assume further that a separate association has not been made between the object instance and Stats1. If the association between the object type and Stats1 is dropped, then an inconsistent state results since the system does not contain an association for the object instance, even though collected statistics on the system exists for that object instance using Stats1. Therefore, the association between the object type and Stats1 cannot be dropped unless the collected statistics are deleted or unless a separate association is made between the object instance and Stats1.

The example of FIGS. 4A–B, 5A–B, and 6 highlights an advantage of the present invention, in which a mechanism is provided that allows the dynamic determination of properties for an instance which override the properties defined for its familial class or object type. The present invention can be invoked at run-time to determine the value of an object property, e.g., the optimizer object type of an object.

The principles of the present invention can be used for other contexts as well. For example, consider a type for which a constraint has been defined for one of its attributes:

CREATE TYPE EMPLOYEE AS OBJECT
      (education VARCHAR(30),
      salary NUMBER CONSTRAINT xxx CHECK (salary between 0 and 1000)
    )

A table can be created with a column of type EMPLOYEE:

CREATE TABLE ENGINEER
      (nameVARCHAR(30),
      emp EMPLOYEE CONSTRAINT yyy CHECK (salary between 100 and 200)

In this case, it is desired to replace the constraint (xxx) that had been placed on the type EMPLOYEE with the new constraint (yyy) on the emp column of the ENGINEER table. For other tables with the EMPLOYEE column, it is desired still enforce the (xxx) constraint.

This is possible with the present invention, with the following sequence of SQL statements:

CREATE TYPE EMPLOYEE AS OBJECT (education varchar(30), salary number);

This is an example of a statement that can be used to create an object type EMPLOYEE.

ASSOCIATE CONSTRAINT WITH TYPE EMPLOYEE USING XXX;

This is an example of a database statement that can be used to associate the object type EMPLOYEE with an object property. In particular, the object property being associated with EMPLOYEE is the constraint (xxx). In one embodiment, an entry is made to a corresponding association table to register this constraint to the object type.

CREATE TABLE ENGINEER (name varchar(30), emp employee);

This is an example of a statement that can be used to create an object instance ENGINEER of the object type EMPLOYEE.

ASSOCIATE CONSTRAINT WITH COLUMNS ENGINEER.EMP USING yyy;

This is an example of a database statement that can be used to associate the object instance ENGINEER with an object property. In particular, the object property being associated with ENGINEER is the constraint (yyy). To implement this association, an entry can be made to the appropriate association table to register the association. Note that since a specific registration is being made for the object instance, this overrides the registration that was made for its familial object type.

As another example, consider a table "T2" which is defined to have a column "col2" of a non-native object type "obj_type2", as set forth below:

CREATE TABLE T2 (
      col2 type2
    )

User-defined indexes, indextypes, and operators can be created that are directed to objects of non-native object type "obj_type2". Details of a method and mechanism for processing a database statement using user-defined indextypes are disclosed in co-pending U.S. application Ser. No. 08/677,159, entitled "Extensible Indexing", filed Jul. 9, 1996 now U.S. Pat. No. 5,893,104, which is hereby incorporated by reference in its entirety.

For the purposes of illustration, assume that a user-defined indextype "index_type2" has been created to index "obj_type2" objects. A user-defined index "index_col2" of indextype index_type2 can thereafter be created for the "col2" column of table "T2". Index_col2 can therefore be considered an instance of the index_type2 class.

If it is desirable to collect statistics for instances of the index_type2 class, then a new optimizer object type, e.g., "stats_index1", can be defined to address the specific structure and properties of this indextype, as well as the type of statistics sought to be collected. The details of the StatsCollect and StatsDelete functions for this new optimizer object type would be defined by a user, administrator, or domain experts that is familiar with the structure and properties of the non-native indextype "index_type2". Once the new optimizer object type stats_index1 has been defined, it can be registered or associated with one or more objects on the system.

Figure 8A:
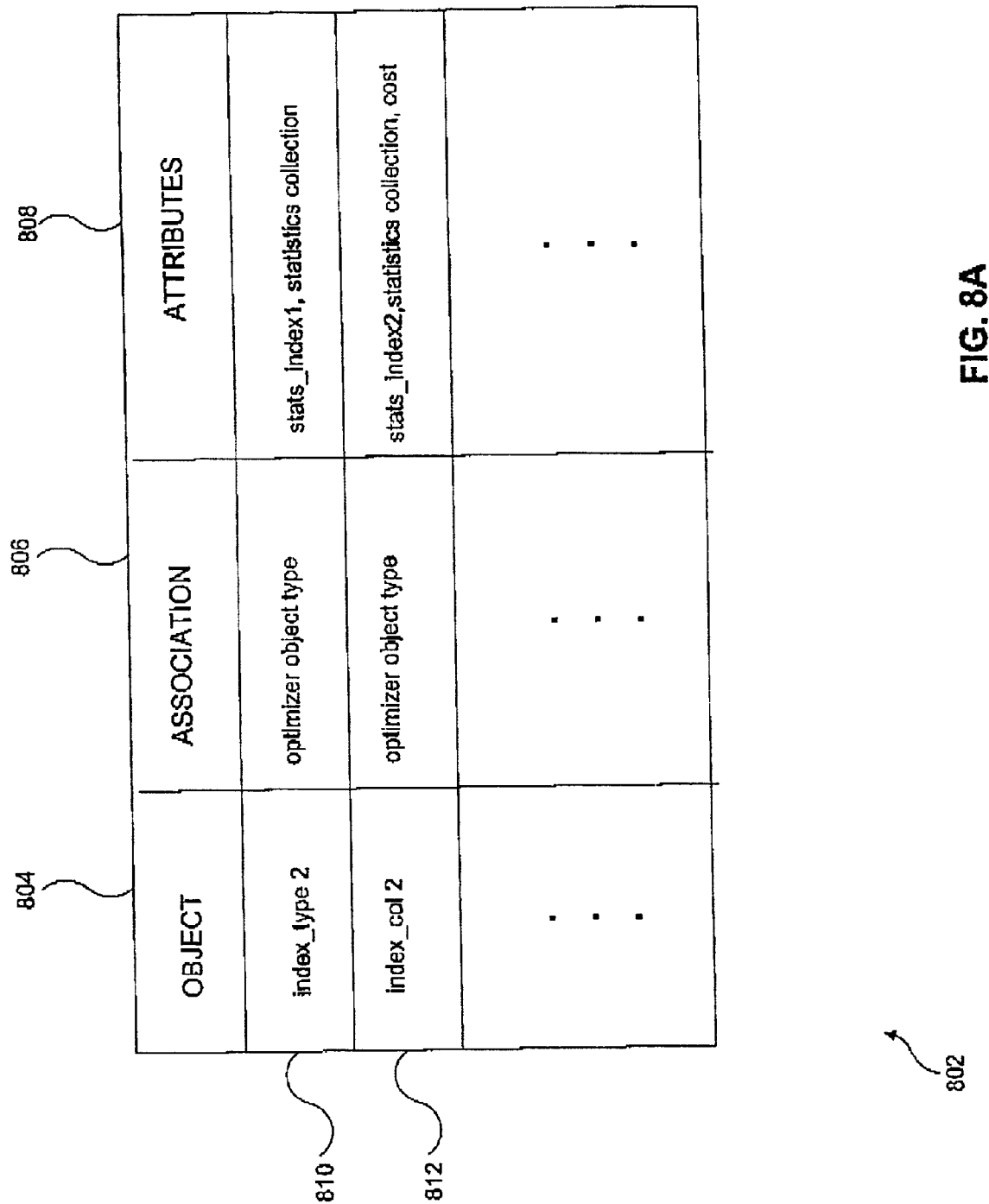
FIG. 8A depicts an example of an association table.

Referring to FIG. 8A, shown is an association table 802 that can be used to associate objects properties with an object. Entry 810 of association table 802 is directed at registering an association of the optimizer object type property to index_type2. Object field 804 of entry 810 identifies index_type2 as the object for which registration is being made, and association field 806 identifies optimizer object type as the property that is being associated with index_type2. Attributes field 808 of entry 810 identifies stats_index1 as the particular optimizer object type that is being registered with index_type2. The attributes field 808 in this example further contains information that identifies the optimizer-related functions implemented within the identified optimizer object type. Specifically, the attributes field 808 contains information identifying statistics collection methods as being defined for the stats_index1 optimizer object type.

Since the class index_type2 has been registered, all instances of this class inherit its defined properties unless additional registration entries are made to explicitly register particular instances to differently defined properties. Entry 812 is an example of a registration entry for directly associating the instance index_col2 with an optimizer object type. By making this direct registration of index_col2, the properties associated with this instance may be different than the properties associated with its familial class. Object field 804 of entry 812 identifies index_col2 as the object for which registration is being made, and association field 806 identifies optimizer object type as the property that is being associated with index_col2. Attributes field 808 of entry 812 identifies stats_index2 as the particular optimizer object type that is being registered with index_col2, rather than the stats_index1 optimizer object type that is associated with the class index_type2. Note that the attributes field 808 of entry 812 contains information that identifies both cost and statistics collection methods as being defined for the stats_index2 optimizer object type. This set of properties for the stats_index2 type associated with index_col2 is different than the set of properties for the stats_index1 type associated with its familial class (which only has the statistics collection functions defined).

Figure 8B:
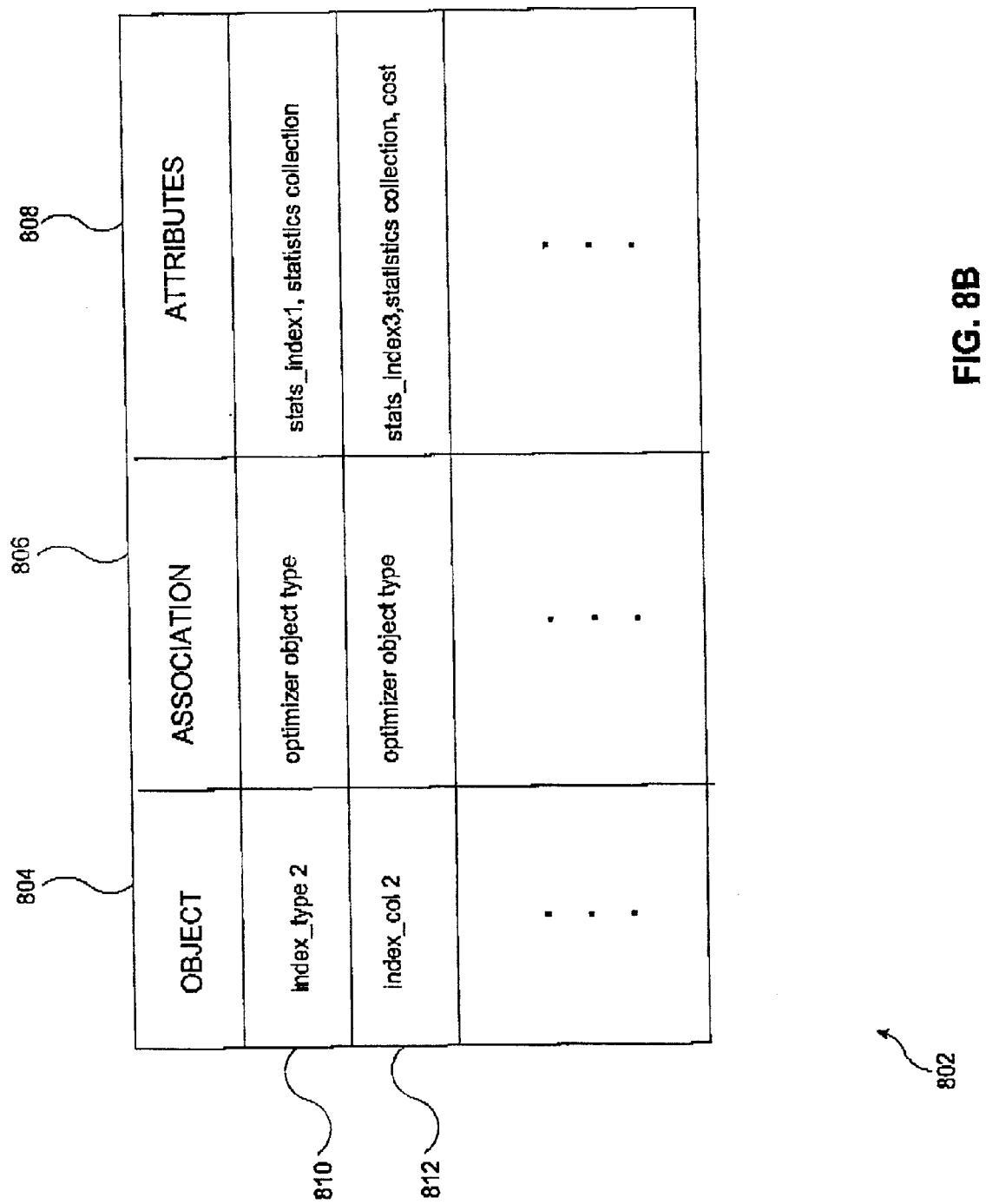
FIG. 8B depicts an amended version of the association table of FIG. 8A.

In the present invention, a mechanism is provided for dynamically changing the set of properties associated with an instance or class at run-time. In an embodiment, this is implemented by modifying the registration entry for an instance or class. For example, assume that it is desired at run-time to modify both the statistics collection and cost functions for index_col2. A new optimizer object type "stats_index3" can be defined for index_col2. New cost and statistics methods can be created and defined for the stats_index3 optimizer object type. The new cost and statistics methods would be defined by a user, administrator, or domain experts that is familiar with the structure and properties of index_col2, as well as the type of cost and statistics calculation to be implemented. A single association command can then be made to associate the new stats_index3 object type with index_col2, to override the previous association that was made for the stats_index2 object type. Referring to FIG. 8B, the new association would cause a modification of the attributes filed 808 of entry 812, to indicate that stats_index3 is now being associated with index_col2. A conflict check can be performed to ensure that data inconsistencies are prevented.

In an alternate embodiment, the optimizer object type itself can be modified to provide a dynamic change to the set of properties for an object. For example, the stats_index2 optimizer object type can be modified to add, delete, or change the optimizer-related functions that are defined for this type. This alternate approach permits a dynamic change to the set of properties for an object without having to change the registration entry for that object.

Note that the invention allows the dynamic determination of the set of properties associated with an instance or class. This dynamic determination can be made at run-time, by changing either the registration entry for a particular instance or class, or the definition of the property for that class. For example, the interface for an object property (e.g., an optimizer object type) can be changed, even after an association has been defined for an object. By implementing the appropriate functions of the interface, the object would have those defined properties, as explained above. A set of properties for an instance or object can be modified to include new properties, delete existing properties, or to change existing properties. The new set of properties for an object can be implemented without having to drop the object or the prior association.

An additional advantage of the present invention is that the association for an entire collection of properties for an instance or class can be made using a single association or disassociation command. This is in contrast to known systems, which require each individual property to be explicitly and separately specified for association. For example, in the present invention, properties can be defined by an interface and implemented as methods to an optimizer object type. By issuing a single command to associate or disassociate, an entire set of properties can be encapsulated into a single optimizer object type and registered to an instance or class.

Another advantage of the present invention is that a mechanism is provided for the dynamic evaluation of property values. This can be used, for example, with extensible optimizers in which multiple optimizer-related functions (e.g., cost functions) are provided at different levels of granularity and precision. At run-time, one of the multiple optimizer-related functions can be dynamically chosen to be associated with an object. More details regarding extensible optimizers and varying levels of granularities for optimizer-related functions are disclosed in co-pending U.S. application Ser. No. 09/272,691, filed Mar. 18, 1999 on even day herewith, which is hereby incorporated by reference in its entirety.

Hardware Overview

Figure 7:
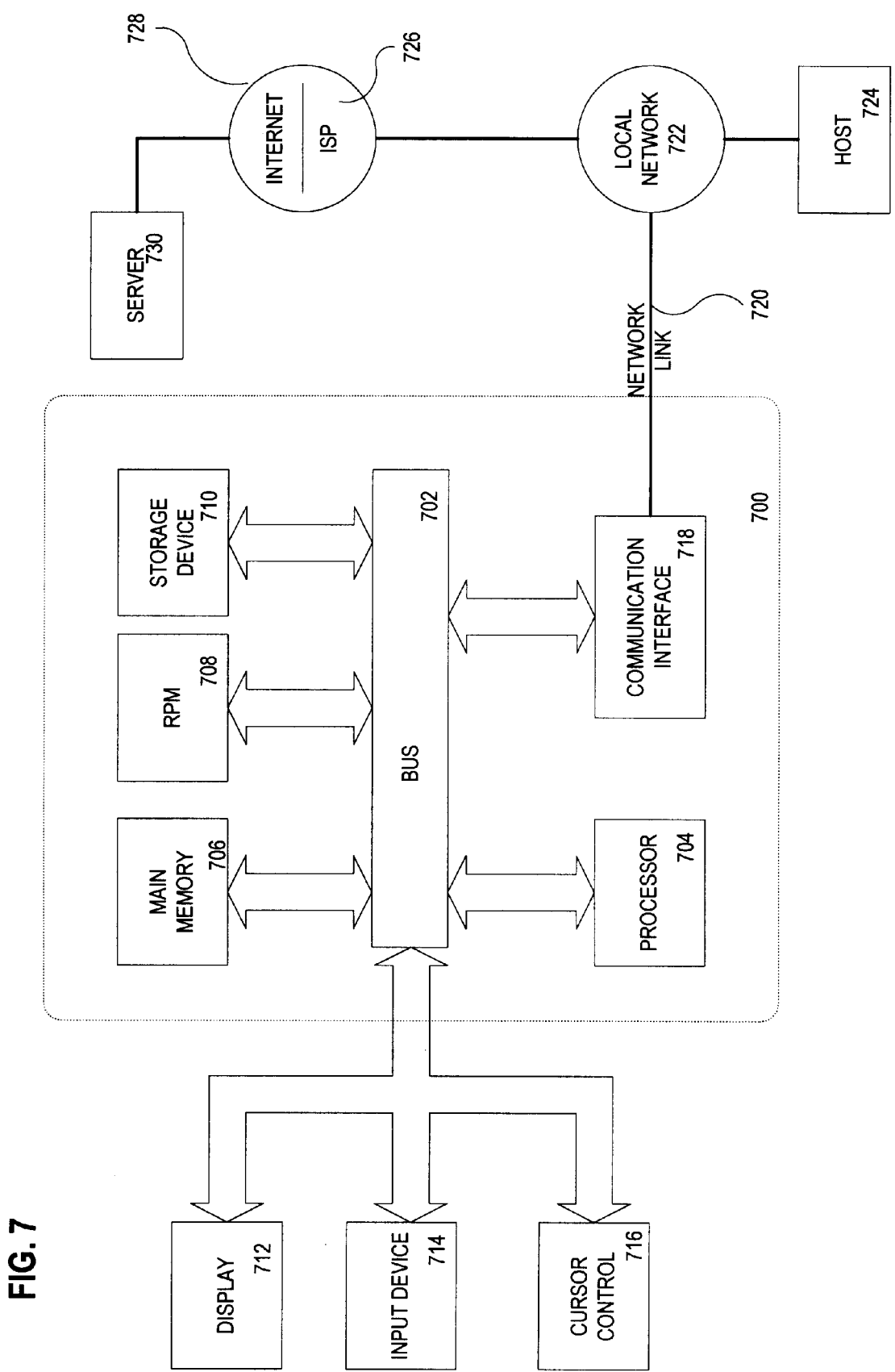
FIG. 7 is a diagram of a computer hardware system with which the present invention can be implemented.

FIG. 7 is a block diagram that illustrates a computer system 700 upon which an embodiment of the invention may be implemented. Computer system 700 includes a bus 712 or other communication mechanism for communicating information, and a processor 714 coupled with bus 712 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for the association and definition of object properties in a computer system. According to one embodiment of the invention, such use is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for the association and registration of object properties in a computer system.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A method of associating an object in a database system to an optimizer-related function, comprising:
   generating a function, said function related to optimizer operations in a database system;
   creating an association of said function to an object type;
   creating a first object, said first object being an instance of said object type; and
   said first object inheriting said association, wherein said function is an optimizer-related function selected from the group consisting of selectivity function, statistics function, and cost function.

2. The method of claim 1 in which creating said association comprises:
   generating an entry in a database table, said entry in said database table comprising a field containing an identifier for said object type.

3. The method of claim 1 further comprising:
   detecting for the presence of possible data inconsistencies.

4. The method of claim 1 further comprising:
   determining whether said association is related to any existing object associations.

5. The method of claim 1 further comprising:
   creating a second object, said second object being a second instance of said object type;
   said second object opting out of said association.

6. The method of claim 5 in which said second object explicitly declares a non-association with said function.

7. The method of claim 5 further comprising:
   creating a second association between said function and said second object, said second association having attributes different from said association.

8. The method of claim 1 further comprising:
   creating a second function, said second function related to said optimizer operations in said database system; and
   changing said association from said object type to said second function.

9. A method of associating an object in a database system to an optimizer-related function, comprising:
   generating a function, said function related to optimizer operations in a database system;
   creating an association of said function to an object type;
   creating a first object, said first object being an instance of said object type; and said first object inheriting said association; and
   detecting for the presence of possible data inconsistencies.

10. A method of associating an object in a database system to an optimizer-related function, comprising:
    generating a function, said function related to optimizer operations in a database system;
    creating an association of said function to an object type;
    creating a first object, said first object being an instance of said object type; and said first object inheriting said association; and
    determining whether said association is related to any existing object associations.

11. A method of associating an object in a database system to an optimizer-related function, comprising:
    generating a function, said function related to optimizer operations in a database system;
    creating an association of said function to an object type;
    creating a first object, said first object being an instance of said object type; and said first object inheriting said association;
    creating a second object, said second object being a second instance of said object type; and
    said second object opting out of said association.

12. The method of claim 11 in which said second object explicitly declares a non-association with said function.

13. The method of claim 11 further comprising:
    creating a second association between said function and said second object, said second association having attributes different from said association.

14. A method of associating an object in a database system to an optimizer-related function, comprising:
    generating a function, said function related to optimizer operations in a database system;
    creating an association of said function to an object type;
    creating a first object, said first object being an instance of said object type; and said first object inheriting said association; and
    creating a second function, said second function related to said optimizer operations in said database system; and
    changing said association from said object type to said second function.

15. A method of associating an object to an object property, comprising:
    identifying one or more object properties;
    creating a first object, said first object being an instance of an object type
    creating an association of said one or more object properties to said object type; and
    dynamically changing said one or more object properties at run-time, in which dynamically changing said one or more object properties comprises adding one or more additional properties to said one or more object properties.

16. A computer program product that includes a medium readable by a processor, the medium comprising a sequence of instructions which, when executed by said processor, causes said processor to execute a process for associating an object in a database system to an optimizer-related function, said process comprising:
    generating a function, said function related to optimizer operations in a database system;
    creating an association of said function to an object type; and
    creating a first object, said first object being an instance of said object type; and said first object inheriting said association, wherein said function is an optimizer-related function selected from the group consisting of selectivity function, statistics function, and cost function.

17. The computer program product of claim 16 in which creating said association comprises:

generating an entry in a database table, said entry in said database table comprising a field containing an identifier for said object type.

18. The computer program product of claim 16 in which the process further comprises:

detecting for the presence of possible data inconsistencies.

19. The computer program product of claim 16 in which the process further comprises:

determining whether said association is related to any existing object associations.

20. The computer program product of claim 16 in which the process farther comprises:

creating a second object, said second object being a second instance of said object type;

said second object opting out of said association.

21. The computer program product of claim 20 in which said second object explicitly declares a non-association with said function.

22. The computer program product of claim 16 in which the process further comprises:

creating a second association between said function and said second object, said second association having attributes different from said association.

23. The computer program product of claim 16 in which the process further comprises:

creating a second function, said second function related to said optimizer operations in said database system; and changing said association from said object type to said second function.

24. A method of associating an object property to an object, comprising:

identifying an object property;

creating a first object, said first object being an instance of an object type creating an association of said object property to said object type; and opting said first object out of said association; and detecting for the presence of possible data conflicts.

25. A method of associating an object property to an object, comprising:

identifying an object property;

creating a first object, said first object being an instance of an object type creating an association of said object property to said object type; and opting said first object out of said association; and determining whether said association is related to any existing object associations.

26. A method of associating an object property to an object, comprising:

identifying an object property;

creating a first object, said first object being an instance of an object type creating an association of said object property to said object type; and opting said first object out of said association; and creating a second object, said second object being a second instance of said object type;

said second object inheriting said association.

27. A method of associating an object property to an object, comprising:

identifying an object property;

creating a first object, said first object being an instance of an object type creating an association of said object property to said object type; and opting said first object out of said association, in which said action of opting said first object out of said association comprises said first object specifically declaring a non-association with said object property.

28. A method of associating an object property to an object, comprising:

identifying an object property;

creating a first object, said first object being an instance of an object type creating an association of said object property to said object type; and opting said first object out of said association, in which said action of opting said first object out of said association comprises creating a second association between said function and said first object, said second association having attributes different from said association.

29. A method of associating an object property to an object, comprising:

identifying an object property;

creating a first object, said first object being an instance of an object type creating an association of said object property to said object type; and opting said first object out of said association;

identifying a second object property; and changing said association from said object type to said second object property.

30. A method of associating an object to an object property, comprising:

identifying one or more object properties;

creating a first object, said first object being an instance of an object type creating an association of said one or more object properties to said object type; and dynamically changing said one or more object properties at run-time, in which dynamically changing said one or more object properties comprises deleting one or more existing properties from said one or more object properties.

31. A method of associating an object to an object property, comprising:

identifying one or more object properties;

creating a first object, said first object being an instance of an object type creating an association of said one or more object properties to said object type; and dynamically changing said one or more object properties at run-time, in which dynamically changing said one or more object properties is performed by execution of a single association command.

32. A method of associating an object to an object property, comprising:

identifying one or more object properties;

creating a first object, said first object being an instance of an object type creating an association of said one or more object properties to said object type; and dynamically changing said one or more object properties at run-time, in which dynamically changing said one or more object properties comprises changing a definition of an object type interface for said one or more object properties.

33. A method of associating an object to an object property, comprising:

identifying one or more object properties;

creating a first object, said first object being an instance of an object type creating an association of said one or more object properties to said object type; and dynamically changing said one or more object properties at run-time, in which dynamically changing said one or more object properties is performed without dropping and recreating said association.

34. A method of associating an object to an object property, comprising:

identifying one or more object properties;

creating a first object, said first object being an instance of an object type creating an association of said one or more object properties to said object type; and dynamically changing said one or more object properties at run-time, in which said one or more object properties are encapsulated into a single type, wherein said association comprises associating said object type to said single type.

35. A computer program product that includes a medium readable by a processor, the medium comprising a sequence of instructions which, when executed by said processor, causes said processor to execute a process for associating an object to an object property, said process comprising:

identifying an object property;

creating a first object, said first object being an instance of an object type creating an association of said object property to said object type; and opting said first object out of said association; and detecting for the presence of possible data conflicts.

36. A computer program product that includes a medium readable by a processor, the medium comprising a sequence of instructions which, when executed by said processor, causes said processor to execute a process for associating an object to an object property, said process comprising:

identifying an object property;

creating a first object, said first object being an instance of an object type creating an association of said object property to said object type; and opting said first object out of said association; and determining whether said association is related to any existing object associations.

37. A computer program product that includes a medium readable by a processor, the medium comprising a sequence of instructions which, when executed by said processor, causes said processor to execute a process for associating an object to an object property, said process comprising:

identifying an object property;

creating a first object, said first object being an instance of an object type creating an association of said object property to said object type; and opting said first object out of said association; and creating a second object, said second object being a second instance of said object type;

said second object inheriting said association.

38. A computer program product that includes a medium readable by a processor, the medium comprising a sequence of instructions which, when executed by said processor, causes said processor to execute a process for associating an object to an object property, said process comprising:

identifying an object property;

creating a first object, said first object being an instance of an object type creating an association of said object property to said object type; and opting said first object out of said association, in which said action of opting said first object out of said association comprises said first object specifically declaring a non-association with said object property.

39. A computer program product that includes a medium readable by a processor, the medium comprising a sequence of instructions which, when executed by said processor, causes said processor to execute a process for associating an object to an object property, said process comprising:

identifying an object property;

creating a first object, said first object being an instance of an object type creating an association of said object property to said object type; and opting said first object out of said association, in which said action of opting said first object out of said association comprises creating a second association between said function and said first object, said second association having attributes different from said association.

40. A computer program product that includes a medium readable by a processor, the medium comprising a sequence of instructions which, when executed by said processor, causes said processor to execute a process for associating an object to an object property, said process comprising:

identifying an object property;

creating a first object, said first object being an instance of an object type creating an association of said object property to said object type; and opting said first object out of said association;

identifying a second object property; and changing said association from said object type to said second object property.

41. A computer program product that includes a medium readable by a processor, the medium comprising a sequence of instructions which, when executed by said processor, causes said processor to execute a process for associating an object to an object property, said process comprising:

identifying one or more object properties;

creating a first object, said first object being an instance of an object type creating an association of said one or more object properties to said object type; and dynamically changing said one or more object properties at run-time, in which dynamically changing said one or more object properties comprises adding one or more additional properties to said one or more object properties.

42. A computer program product that includes a medium readable by a processor, the medium comprising a sequence of instructions which, when executed by said processor, causes said processor to execute a process for associating an object to an object property, said process comprising:

identifying one or more object properties;

creating a first object, said first object being an instance of an object type creating an association of said one or more object properties to said object type; and dynamically changing said one or more object properties at run-time, in which dynamically changing said one or more object properties comprises deleting one or more existing properties from said one or more object properties.

43. A computer program product that includes a medium readable by a processor, the medium comprising a sequence of instructions which, when executed by said processor, causes said processor to execute a process for associating an object to an object property, said process comprising:

identifying one or more object properties;

creating a first object, said first object being an instance of an object type creating an association of said one or more object properties to said object type; and dynamically changing said one or more object properties at run-time, in which dynamically changing said one or more object properties comprises changing a definition of an object type interface for said one or more object properties.

44. A computer program product that includes a medium readable by a processor, the medium comprising a sequence of instructions which, when executed by said processor, causes said processor to execute a process for associating an object to an object property, said process comprising:

identifying one or more object properties;

creating a first object, said first object being an instance of an object type creating an association of said one or more object properties to said object type; and dynamically changing said one or more object properties at run-time, in which dynamically changing said one or more object properties is performed without dropping and recreating said association.

45. A computer program product that includes a medium readable by a processor, the medium comprising a sequence of instructions which, when executed by said processor, causes said processor to execute a process for associating an object to an object property, said process comprising:

identifying one or more object properties;

creating a first object, said first object being an instance of an object type creating an association of said one or more object properties to said object type; and dynamically changing said one or more object properties at run-time, in which said one or more object properties are encapsulated into a single type, wherein said association comprises associating said object type to said single type.

* * * * *